(12) United States Patent
Kato et al.

(10) Patent No.: US 6,924,246 B2
(45) Date of Patent: Aug. 2, 2005

(54) LEAD-FREE GLASS COMPOSITIONS FOR DECORATING CERAMIC MATERIALS

(75) Inventors: Keizo Kato, Nagoya (JP); Takuya Kawamura, Nagoya (JP); Nobuhiro Inoko, Nagoya (JP); Hiroshi Norizuki, Nagoya (JP)

(73) Assignee: Noritake Co., Limited, Nagoya (JP)

( * ) Notice: Subject to any disclaimer, the term of this patent is extended or adjusted under 35 U.S.C. 154(b) by 180 days.

(21) Appl. No.: 10/630,865

(22) Filed: Jul. 31, 2003

(65) Prior Publication Data

US 2004/0029700 A1 Feb. 12, 2004

(30) Foreign Application Priority Data

Aug. 7, 2002 (JP) .................................. 2002-229902

(51) Int. Cl.[7] ................................................. C03C 8/22
(52) U.S. Cl. ............................ 501/16; 501/17; 501/21; 501/66
(58) Field of Search ............................. 501/16, 17, 22, 501/61

(56) References Cited

U.S. PATENT DOCUMENTS

| | | | |
|---|---|---|---|
| 5,447,891 A | * | 9/1995 | Spinosa et al. ................ 501/16 |
| 2002/0022133 A1 | | 2/2002 | Hayashi et al. |

FOREIGN PATENT DOCUMENTS

| | | | | |
|---|---|---|---|---|
| EP | 1 083 155 A1 | | 3/2001 | |
| JP | 57191253 A | * | 11/1982 | ............. C03C/3/08 |
| JP | A 6-56558 | | 3/1994 | |
| JP | A 7-267677 | | 10/1995 | |
| JP | A 8-133816 | | 5/1996 | |
| JP | A 8-259258 | | 10/1996 | |
| JP | 10-167756 | | 6/1998 | |

* cited by examiner

*Primary Examiner*—David Sample
(74) *Attorney, Agent, or Firm*—Oliff & Berridge, PLC

(57) ABSTRACT

A new lead-free glass flux suitable for the decoration of ceramic materials comprises $SiO_2$, $Al_2O_3$, $B_2O_3$ and $Li_2O$ as essential components. The lead-free glass flux is a glass mixture in which a glass composition having a relatively low coefficient of thermal expansion and a glass composition having a relatively high coefficient of thermal expansion and a relatively high chemical resistance are mixed at an appropriate ratio.

14 Claims, No Drawings

LEAD-FREE GLASS COMPOSITIONS FOR DECORATING CERAMIC MATERIALS

This application claims priority to Japanese Patent Application No. 2002-229902, filed Aug. 7, 2002, the contents of which are incorporated herein by reference.

BACKGROUND OF THE INVENTION

1. Field of the Invention

The present invention relates to a substantially lead-free glass flux compositions used for the decoration of ceramic materials and methods for making the same. The present invention also relates to materials for decorating ceramic materials which contain said glass flux compositions and methods for making the same.

2. Description of the Related Art

Generally, a material for decorating a ceramic material is composed of one or more pigments and a glass flux. For example, Japanese Laid-Open Patent Publication No. 6-56558 describes a decorating material for decorating the surface of a ceramic material with noble metal. As a glass flux for use in a decorating material, it is preferable to use a glass flux mainly composed of $SiO_2$ (typically, a glass flux having a $SiO_2$ content of 45% by mass or more) in order to achieve clear development and luster for a decoration (hereinafter also referred to as "painting") formed by the decoration and to improve the water resistance, chemical resistance such as acid resistance, alkali resistance and detergent resistance required for ceramic materials of the painting.

In so-called on-glaze (overglaze) decoration, a decorating material (paint) including various pigments (coloring components) is applied to a glazed surface that has been previously formed on the surface of a ceramic material (e.g., a glaze layer that is formed on porcelain with a hard glaze), and is then fired at a relatively low temperature of about 750 to 900° C. Accordingly, the glass flux contained in such a decorating material for on-glaze decoration is required to have a lower melting temperature and a lower softening point, which is the index of a melting temperature, than those of a glass flux contained in a decorating material for in-glaze decoration, which is normally fired at 1000 to 1300° C. On the other hand, the softening point of a glass composition generally tends to increase with an increase in its $SiO_2$ content. For this reason, it is preferable that glass flux contained in a decorating material for on-glaze decoration has a low softening point suitable for on-glaze decoration, while maintaining the $SiO_2$ content at a relatively high level.

In order to satisfy the above-described requirements, glass compositions (lead-containing glasses), which contain lead (Pb) as a component for lowering the softening point, have conventionally been used as the glass flux for a decorating material for on-glaze decoration. For example, Japanese Laid-Open Patent Publication No. 7-267677 discloses a lead-containing glass flux for use in a decorating material. Presently, lead-free glass compositions, which contain components other than lead that have the function of lowering a softening point, have begun to be used as the glass flux for a decorating material for on-glaze decoration. For example, Japanese Patent No. 2991370 (Japanese Laid-Open Patent Publication No. 8-259258) describes decorating materials for on-glaze decoration that contain a lead-free glass composition which is based within the $Li_2O$—$Al_2O_3$—$SiO_2$ system. For example, the lead-free glass composition just described contains, in place of lead, $Li_2O$ or other alkali metal oxides as components for promoting melting (i.e., components for lowering the softening point). Japanese Laid-Open Patent Publication No. 10-167756 discloses a lead-free decorating material for on-glaze decoration that contains niobium oxide or tantalum oxide for creating a quality similar to that of a lead-containing decorating material for on-glaze decoration.

However, sufficient consideration has not been given to the conventional lead-free glass fluxes for use in a decorating material, with respect to the thermal expansion. That is, if the thermal expansion rate (the coefficient of thermal expansion) of the glass flux in a decorating material is too much higher than those of the body and glazed surface of a ceramic material, the difference in their thermal expansion may cause such problems as the peeling of a painting and the excessive crazing, when firing the decorating material applied on the glazed surface of the ceramic material at a predetermined temperature. For this reason, it is preferable that the coefficient of thermal expansion of the glass flux is approximately that of the body and glaze of a ceramic material.

However, the conventional lead-free glass compositions used as the glass flux for a decorating material for on-glaze (overglaze) decoration (e.g., a lead-free glass composition with a high $SiO_2$ content that contains an alkali metal oxide as a component for promoting melting) have such an undesirable tendency in that the coefficient of thermal expansion increases with a decreasing softening point (melting temperature).

SUMMARY OF THE INVENTION

It is, accordingly, one object of the present invention to provide a lead-free and high $SiO_2$ content glass flux composition suitable for decorating ceramic materials that has both a low softening point and a low coefficient of thermal expansion. Further, it is another object of the present invention to provide decorating materials (paints) containing such a glass flux composition and a method for making the same.

It is possible to achieve both a low softening point and a low coefficient of thermal expansion by a glass flux that contains a reduced amount of an alkali metal oxide, which increases thermal expansion, and that does not contain MgO, CaO and ZnO. Such a glass flux, however, generally has low chemical resistance (which is chemical resistance with regard to a painting layer (glass layer) formed with the above-described glass flux). The present invention provides a glass flux composition suitable for a decorating material. This glass flux is essentially free from lead and contains $SiO_2$, $Al_2O_3$, $B_2O_3$, and $Li_2O$ as essential components. The lead-free glass flux taught herein is a glass mixture in which a glass composition has a relatively low coefficient of thermal expansion and relatively low chemical resistance, and which is a glass composition that has a relatively high coefficient of thermal expansion and relatively high chemical resistance, all of which are mixed in an appropriate ratio.

Preferably, a lead-free glass flux is a combination (physical mixture) of the following two lead-free glass compositions.

One of the two glass compositions, which is essentially free from lead, comprises, in mass percent, $SiO_2$: 45 to 60%, $Al_2O_3$: 5 to 20%, $B_2O_3$: 15 to 35%, and one or more alkali metal oxides: 5 to 10%, provided that $Li_2O$ is contained in an amount of 2% or more, with the proviso that the total amount of said oxides is 90% or more of the total mass of the composition. Preferably, the glass composition is substantially composed of above-described oxides.

The other of the two glass compositions, which is essentially free from lead, comprises, in mass percent, $SiO_2$: 45 to 60%, $Al_2O_3$: 5 to 20%, $B_2O_3$: 5 to 20%, at least one of MgO, CaO, ZnO: 5 to 20% in total, and one or more alkali metal oxides: 10 to 15%, provided that $Li_2O$ is contained in an amount of 2% or more, with the proviso that the total amount of said oxides is 90% or more of the total mass of the composition. Preferably, the glass composition is substantially composed of above-described oxides. Preferably, the coefficient of thermal expansion of a glass molded product formed from said glass flux (i.e. a glass body that has solidified after melting of said flux) is typically $6.5\times10^{-6}K^{-1}$ or less.

According to the glass flux taught herein, the above-mentioned two lead-free glass compositions, that is, (a) a lead-free glass composition having a relatively low coefficient of thermal expansion (hereinafter, simply abbreviated as "low expansion lead-free glass composition" or "A") and (b) a lead-free glass composition having a relatively high coefficient of thermal expansion (hereinafter, simply abbreviated as "high expansion lead-free glass composition" or "B") are mixed at a mixing ratio at which the coefficient of thermal expansion of a glass molded product formed from the above-mentioned flux (i.e., a glass molded product formed by melting and mixing the two glass compositions) is approximately $6.5\times10^{-6}K^{-1}$ or less. As a result, a glass layer with a high $SiO_2$ content in which both a low thermal expansion and high chemical resistance are achieved (i.e., a glass layer with an excellent luster) can be formed on a glazed layer of a ceramic material. Accordingly, the use of a glass flux of the present invention as a glass component of a decorating material makes it possible to form a painting that has no peeling or crazing on a glazed surface of a ceramic material (e.g., on a hard glazed, porcelain surface) by overglaze decoration.

Preferably, the coefficient of thermal expansion of the glass composition A (low expansion lead-free glass composition) is in the range of $5.0\times10^{-6}K^{-1}$ to $6.5\times10^{-6}K^{-1}$ and the coefficient of thermal expansion of the glass composition B (high expansion lead-free glass composition) is in the range of $7.0\times10^{-6}K^{-1}$ to $9.0\times10^{-6}K^{-1}$. A glass flux suitable for on-glaze (overglaze) decoration that is excellent in low thermal expansion properties (typically, the coefficient of thermal expansion is $6.5\times10^{-6}K^{-1}$ or less, more preferably $6.0\times10^{-6}K^{-1}$ or less), and has superior chemical resistance can be provided by mixing glass compositions A and B, each having a coefficient of thermal expansion in the above range.

More preferably, the softening point of each of the glass composition A and the glass composition B is in the range of approximately 500 to 600° C. A glass flux suitable for on-glaze (overglaze) decoration that is excellent in melting properties at low temperatures can be provided by mixing glass compositions A and B, each having a softening point in the above range.

Preferably, the mixing ratio of glass composition A (low expansion lead-free glass composition) and glass composition B (high expansion lead-free glass composition), on a mass basis, is 5 to 25 parts of glass composition B to 75 to 95 parts of glass composition A (provided that the total of A and B is 100 parts). Such a mixing ratio can readily achieve a low thermal expansion and a low softening point (melting properties at low temperatures) that are desirable for on-glaze (overglaze) decoration, while maintaining high chemical resistance.

In a preferable lead-free glass flux, glass composition A and glass composition B that are mixed, are each prepared in powdered form. Such a glass flux in the form of powder is easy to use as a glass flux component of a decorating material.

Furthermore, the present invention provides a composition (decorating material) suitable for decoration on a glazed surface of a ceramic material, comprising at least one of the lead-free glass fluxes taught herein and at least one pigment (colorant). Typically, the coefficient of thermal expansion of the above-mentioned composition can be $7.0\times10^{-6}K^{-1}$ or less (e.g., $2.0\times10^{-6}K^{-1}$ to $7.0\times10^{-6}K^{-1}$, preferably $2.0\times10^{-6}K^{-1}$ to $6.0\times10^{-6}K^{-1}$). This composition (decorating material) contains the above-described glass flux, so that it can form a high-quality painting with superior chemical resistance on a glazed surface of a ceramic material (e.g., on a hard glaze of a porcelain) by on-glaze (overglaze) decoration, and prevents peeling or crazing from occurring.

A preferred composition (decorating material) may be substantially composed of, in mass percent, 70 to 95% of the lead-free glass flux taught herein and 5 to 30% of at least one pigment, taking the total mass of the composition as 100%. A composition (decorating material) having such a constitution has high chemical resistance and superior ability to prevent peeling, so that it can form a high-quality painting. Alternatively, the decorating material taught herein may comprise at least one low expansion ceramic raw material in a content of 10% or less of the total mass of the composition, in addition to the above-described glass flux and pigment.

Furthermore, the present invention provides a method for making a composition suitable for the decoration on a glazed surface of a ceramic material. This method separately prepares: A, a glass composition which is essentially free from lead and which comprises $Li_2O$, $B_2O_3$, $Al_2O_3$ and $SiO_2$ as essential ingredients, and the coefficient of thermal expansion of said composition is in the range of $5.0\times^{-6}K^{-1}$ to $6.5\times10^{-6}K^{-1}$; B, a glass composition which is essentially free from lead and which comprises $Li_2O$, $B_2O_3$, $Al_2O_3$, $SiO_2$ and at least one of MgO, CaO and ZnO as essential ingredients, and the coefficient of thermal expansion of said composition is in the range of $7.0\times10^{-6}K^{-1}$ to $9.0\times10^{-6}K^{-1}$; and C, at least one pigment. Then, the prepared glass composition A, glass composition B and pigment C are mixed such that a composition (decorating material) having a coefficient of thermal expansion of $7.0\times10^{-6}K^{-1}$ or less (e.g., $2.0\times10^{-6}K^{-1}$ to $7.0\times10^{-6}K^{-1}$, preferably $3.0\times10^{-6}K^{-1}$ to $6.0\times10^{-6}K^{-1}$) is obtained as a final product. Preferably, the softening point of each of glass composition A and glass composition B is in the range of 500 to 600° C.

The method of the present invention can provide a decorating material containing a lead-free glass flux composition which has both the above-described low coefficient of thermal expansion and high chemical resistance.

Preferably, the glass composition A that is prepared comprises, in mass percent, $SiO_2$: 45 to 60%, $Al_2O_3$: 5 to 20%, $B_2O_3$: 15 to 35%, and one or more alkali metal oxides: 5 to 10%, provided that $Li_2O$ is contained in an amount of 2% or more, with the proviso that the total amount of said oxides is 90% or more of the total mass of the composition. Preferably, the glass composition B that is prepared comprises, in mass percent, $SiO_2$: 45 to 60%, $Al_2O_3$: 5 to 20%, $B_2O_3$: 5 to 20%, at least one of MgO, CaO, ZnO: 5 to 20% in total, and one or more alkali metal oxides: 10 to 15%, provided that $Li_2O$ is contained in an amount of 2% or more, with the proviso that the total amount of said oxides is 90% or more of the total mass of the composition. By mixing glass composition A and glass composition B having the above-described constitutions, it is possible to appropriately make a decorating material that has the ability to prevent crazing or peeling and can form a painting with excellent luster.

Preferably, in the mixing step, the glass composition (a) and the glass composition (b) are mixed in the ratio on a mass basis of 5 to 25 parts of the glass composition (b) to 75 to 95 parts of the glass composition (a), provided that the total of (a) and (b) is 100 parts, thereby obtaining a mixture which comprises, in mass percent, 70 to 95% of the total of the glass composition (a) and the glass composition (b) and 5 to 30% of the decorating pigment (c), provided that the total of (a), (b) and (c) is 100 mass %. A composition (decorating material) formed from this mixture has a high chemical resistance and a superior ability to prevent crazing or peeling, so that it can form a painting having high quality, such as luster, on a glazed surface.

DETAILED DESCRIPTION OF THE INVENTION

Hereinafter, preferred embodiments of the present invention will be described. It should be noted that the percentage representation (%) in the following description refers to % by mass (mass %), and is synonymous with % by weight (wt %), which was conventionally used.

In this specification, "thermal expansion coefficient" and "softening point" of glass compositions, glass fluxes and decorating materials refer to values calculated as follows. That is, a softening point (similar to a yield point) is a value obtained by performing a differential thermal analysis (DTA) on a glass sample to be measured (typically, a temperature corresponding to the second endothermic peak appearing when performing a differential thermal analysis). The softening point can be measured in accordance with the Fibre Elongation Method prescribed in JIS-R-3104 and ASTM-C338. Further, the thermal expansion coefficient is an average coefficient of thermal expansion calculated by compression molding a glass composition, glass flux or decorating material that is to be measured, firing it at a temperature approximately 300° C. higher than the softening point for 100 minutes to produce a rod-shaped glass molded material with dimensions of 20 mm length×5 mm diameter and measuring the difference in the thermal expansion of the rod-shaped glass molded material from room temperature to 900° C. by a TMA analyzer (differential thermal expansion meter).

As described above, the glass flux taught herein is a lead-free glass composition comprising $SiO_2$, $Al_2O_3$, $B_2O_3$ and $Li_2O$ as essential components (i.e., a lead-free glass composition based within the $Li_2O$-$Al_2O_3$-$B_2O_3$-$SiO_2$ system). It is a flux (melting agent) used as a glass component for use in a decorating material prepared by physically mixing a lead-free glass frit having a low coefficient of thermal expansion (i.e., glass composition A) and a lead-free glass frit having a high coefficient of thermal expansion (i.e., glass composition B), which are different from one another in the types of contained components (oxides) and their contents.

The low expansion lead-free glass composition, which is one of the constituting elements of the glass flux of the present invention, comprises $SiO_2$, $Al_2O_3$, $B_2O_3$ and $Li_2O$ as essential components. $SiO_2$ is the main component that constitutes the backbone of a glass layer (painting) formed on a glazed surface of a ceramic material. In this regard, it is desirable that the silica content be high. However, when the $SiO_2$ content is too high, the melting temperature (softening point) becomes too high, so that such a content is not preferable. On the other hand, when the $SiO_2$ content is too low, a good glass layer cannot be formed, so that an excellent color development of any pigments may be impaired to decrease the luster. In addition, the water resistance, chemical resistance or the like may be reduced.

The $SiO_2$ content is preferably 45 to 60% of the total mass of the low expansion lead-free glass composition and more preferably, about 50 to 60%.

$Al_2O_3$ is a component that controls the fluidity of a glass melt and is involved in the adhesion stability of the melt on the glazed surface. The $Al_2O_3$ content is preferably 5 to 20% of the total mass of the low expansion lead-free glass composition and more preferably, about 7 to 10%. When the $Al_2O_3$ content is too low, the adhesion stability of the melt may be decreased, impeding the formation of a glass layer with uniform thickness on the glazed surface. On the other hand, when the $Al_2O_3$ content is too high, the chemical resistance of the glass layer may be reduced, so that such a content is not preferable.

$B_2O_3$ is a component that has a high effect of lowering a softening point and a melting temperature. It is also a component that is capable of improving the transmittance of a glass layer formed on a glazed layer, while increasing the luster. The $B_2O_3$ content is preferably 15 to 35% and more preferably about 20 to 30%. When the $B_2O_3$ content is too low, the effect of lowering a softening point and a melting temperature cannot be achieved. On the other hand, when the $B_2O_3$ content is too high, the water resistance of a glass layer (painting) may be decreased, so that such a content is not preferable.

$Li_2O$ is one kind of alkali metal oxide and a component that is particularly capable of lowering a softening point and a melting temperature. It also has the ability to improve the chemical resistance (particularly, acid resistance), as well as promote the clear color development of a painting (pigment). Furthermore, it can form a low expansive crystal in a glass layer by firing. $Li_2O$ can be partly replaced by other alkali metal oxides, typically $Na_2O$ and $K_2O$.

The content of the alkali metal oxides is preferably 5 to 10% of the total mass of the low expansion lead-free glass composition, and more preferably about 8 to 10%. The $Li_2O$ content is preferably 2% or more, and more preferably 4% or more. Accordingly, a preferable range of the content of alkali metal oxides (e.g., $Na_2O$, $K_2O$, etc.), other than $Li_2O$, is the difference obtained by subtracting the $Li_2O$ content from the above-mentioned preferable range of the content of the alkali metal oxides. When the content of the alkali metal oxides including $Li_2O$ is too much lower than the above-described numerical range, the effect of lowering a softening point and a melting temperature cannot be achieved. On the other hand, when the above-mentioned content is too high, the coefficient of thermal expansion becomes too high, so that such a content is not preferable.

The high expansion lead-free glass composition, which is the other component of the glass flux of the present invention, comprises $SiO_2$, $Al_2O_3$, $B_2O_3$ and $Li_2O$ as essential components, as with the above-mentioned low expansion lead-free glass composition. The effects achieved by these components are the same as described above, and redundant descriptions are omitted. The $SiO_2$ content and the $Al_2O_3$ content of the high expansion lead-free glass composition may be the same as those of the low expansion lead-free glass composition. Additionally, it is preferable to set the content of the alkali metal oxides including $Li_2O$ higher than that of the low expansion lead-free glass composition. This makes it possible to improve the effect of lowering the softening point of the glass flux. The content of the alkali metal oxides is preferably 10 to 15% of the total mass of the high expansion lead-free glass composition and more preferably about 12 to 15%. However, the $Li_2O$ content is preferably 2% or more, and more preferably 5% or more (e.g., 5 to 8%). When the content of the alkali metal oxides including $Li_2O$ is too much higher than the above-mentioned numerical range, the coefficient of thermal expansion becomes excessively high, so that such a content is not preferable.

The high expansion lead-free glass composition comprises, in addition to the above-mentioned main components, at least one metal oxide selected from MgO, CaO and ZnO. MgO, CaO and ZnO are components that are capable of adjusting a thermal expansion coefficient. In addition to such an adjusting function, ZnO also contributes to the enhancement of color development and increases the luster of a painting after firing, as well as to the improvement of the melt adhesion of a glass layer (painting layer) to the glazed surface and the body. Additionally, CaO is a component that is capable of increasing the hardness of the glass layer (painting layer), thereby improving the abrasion resistance, and MgO is a component that is capable of also modifying the viscosity when melting the glass. Inclusion of these components makes the glass flux a multicomponent glass flux, making it possible to improve the chemical resistance. Typically, at least one of these oxides is contained in a content of 5 to 20% of the total mass of the high expansion lead-free glass composition, and the content is preferably about 7 to 15%. For example, the ZnO content is preferably 3 to 5%, and each of the CaO and MgO contents is preferably 2 to 5%.

It should be noted that the above-described compositions are preferred examples of the low expansion lead-free glass composition and the high expansion lead-free glass composition that can be used for preparation of the glass fluxes of the present invention, and the present invention is not limited thereto. For example, although the low expansion lead-free glass composition and the high expansion lead-free glass composition may be each composed only of the above-described main components (essential oxide components), they may contain, in addition to these main components, various secondary components (the total secondary components are preferably not more than 10% of the total mass of the glass compositions), so long as the objects of the present invention can be achieved. For example, the low expansion lead-free glass composition may contain a suitable amount of MgO, CaO and/or ZnO as a secondary component.

Preferable examples of such secondary components include $ZrO_2$. $ZrO_2$ is a component that is capable of improving the chemical resistance (particularly, alkali resistance). It is preferable that the low expansion lead-free glass composition and the high expansion lead-free glass composition contain $ZrO_2$ in a content of approximately 2 to 10%, typically 4 to 7%. However, when the $ZrO_2$ content is too high, the softening point significantly increases, so that such a content is not preferable. Further, in addition to the above-mentioned oxides, $P_2O_5$, BaO, $Bi_2O_3$, $La_2O_3$, $TiO_2$, $SnO_2$ or the like, may be contained in a suitable amount such that the content thereof is 10% or less (e.g., 0 to 5%) of the total mass of the glass composition, for various purposes (e.g., improving the stability and adjusting the transparency (transmittance) of the glass layer).

The coefficient of thermal expansion of the low expansion lead-free glass composition, which is mixed with the glass flux for use in a decorating material for applying an on-glaze (overglaze) decoration or the like on a glazed surface of a ceramic material (e.g., a hard glaze surface of a porcelain), is preferably $5.0 \times 10^{-6} K^{-1}$ or more, to less than $6.5 \times 10^{-6} K^{-1}$, particularly $5.5 \times 10^{-6} K^{-1}$ or more, to less than $6.0 \times 10^{-6} K^{-1}$. Further, the softening point thereof is preferably in the range of 500 to 600° C. Accordingly, the content of each of the above-mentioned main components and secondary components, may be determined such that the low expansion lead-free glass composition exhibits such a thermal expansion coefficient and/or softening point. On the other hand, the coefficient of thermal expansion of the high expansion lead-free glass composition, which is combined with the low expansion lead-free glass composition exhibiting such thermal expansion coefficient and/or softening point, is preferably $7.0 \times 10^{-6} K^{-1}$ or more, to less than $9.0 \times 10^{-6} K^{-1}$, particularly $7.5 \times 10^{-6} K^{-1}$ or more, to less than $9.0 \times 10^{-6} K^{-1}$. Further, the softening point is preferably in the range of 500 to 600° C. Accordingly, the content of each of the oxides serving as the above-mentioned main components or secondary components, may be determined such that the high expansion lead-free glass composition exhibits such a thermal expansion coefficient and/or softening point.

There is no particular limitation with respect to the methods of making the low expansion lead-free glass composition and the high expansion lead-free glass composition. Methods similar to those used for making conventional glass compositions can be used. Typically, compounds that can provide the various oxide components constituting the above-mentioned compositions (e.g., industrial products, reagents or various mineral materials that contain oxides, carbonates, nitrates, composite oxides containing the above components) and, as necessary, other additives are charged into a mixer such as a wet or dry ball mill at a predetermined mixing ratio, and mixed for several hours to several tens of hours. After being dried, the obtained mixture is placed in a fire resistant crucible, and heated and melted at a suitably high temperature, typically 900° C. to 1500° C. Then, this molten product is rapidly cooled (preferably introduced in water) into glass. The obtained vitreous composition can be formed into desired forms by various methods. For example, a powdered glass composition (frit) having a desired average particle size of 0.1 μm to 10 μm can be formed by pulverizing it with a ball mill or suitably sieving it.

Then, a desired glass flux can be prepared by mixing the low expansion lead-free glass composition and the high expansion lead-free glass composition (preferably glass frits in powdered form) obtained as above at a suitable mixing ratio. The glass flux for use in a decorating material is preferably prepared in powdered form. Such a powered glass flux (preferable average mean particle size: 1 μm to 10 μm) can be obtained by mixing the powdered low expansion lead-free glass composition (frit) and high expansion lead-free glass composition (frit). For example, a glass flux in which these glass compositions are uniformly mixed, that is, a homogeneous mixture of two kinds of glass frits can be prepared by mixing and stirring these two powered glass compositions by commonly used mixing and stirring means (e.g., various mixers and pulverizers).

In the preparation of the glass flux, the mixing ratio of the above two glass compositions may be suitably adjusted such that the coefficient of thermal expansion of a glass layer (glass product) formed from the above flux is $6.5 \times 10^{-6} K^{-1}$ or less, preferably $6.0 \times 10^{-6} K^{-1}$ or less, and more preferably $5.0 \times 10^{-6} K^{-1}$ or less (e.g., $3.0 \times 10^{-6} K^{-1}$ to $5.0 \times 10^{-6} K^{-1}$). In general, the coefficients of thermal expansion of the body and glaze (glaze layer) of a ceramic material are $5.5 \times 10^{-6} K^{-1}$ or less, typically $2.0 \times 10^{-6} K^{-1}$ to $5.0 \times 10^{-6} K^{-1}$. It is preferable that the coefficients of thermal expansion of these objects to be decorated, and those of a glass flux and a decorating material composed mainly of the glass flux are similar to one another. This makes it possible to more effectively prevent peeling or crazing of a glass layer (painting) that has been decorated and fired. In particular, it is preferable that a glass flux for use in a decorating material for applying an on-glaze (overglaze) decoration on a glazed surface of porcelain or china, has a low softening point, preferably 600° C. or less. Furthermore, the coefficient of thermal expansion is preferably $6.0 \times 10^{-6} K^{-1}$ or less, and more preferably $5.0 \times 10^{-6} K^{-1}$ or less (e.g., $2.5 \times 10^{-6} K^{-1}$ to $5.0 \times 10^{-6} K^{-1}$). Such a glass flux having a low thermal expansion coefficient can be obtained by mixing a low expansion lead-free glass composition and a high expansion lead-free glass composition, each having above-mentioned preferable coefficient of thermal expansion and softening point, at the following mixing ratio: 5–25 parts of the high expansion lead-free glass composition to 75–95 parts of the low expansion lead-free glass composition in a mass ratio (provided that the total of these compositions is 100 parts).

A decorating material provided by the present invention comprises various pigments as main constituents, in addition to the glass flux. Examples of these pigments include various inorganic pigments (e.g., zircon, turquoise blue, maroon, vanadium-zirconium yellow, cobalt blue, titanium white and cobalt silicate). In particular, it is preferable to use zircon ($ZrSiO_4$) and/or zircon-based pigment which refers to an inorganic pigment such as turquoise blue in which various metallic elements (V, Pr, Fe, Co, Ni and the like) form a solid solution in $ZrO_2/SiO_2$. Zircon and a zircon-based pigment generally have a low coefficient of thermal expansion, so that they can also serve as an adjusting material for lowering the thermal expansion coefficient of a decorating material.

In order to adjust the thermal expansion, various low expansion ceramic raw materials (ceramic thermal expansion modifiers) can be added to a decorating material, preferably, in a content of 10% or less (e.g., 1 to 10%) of the total amount of the decorating material. Examples of such ceramic raw materials include cordierite, β-eucryptite, β-spodumene and petalite. It is preferable to include at least one of eucryptite, spodumene and petalite, each containing Li, Al, Si and O as constituent elements. It is more preferable to add β-eucryptite.

A decorating material of the present invention is provided typically in powered form. Such a powdered decorating material can be made by mixing and stirring a glass flux and a pigment that are prepared in powdered form and, as necessary, the above-mentioned low expansion ceramic raw material and other additives (e.g., glycerin, turpentine oil, fatty oil, gelatin) at a mixing ratio at which the coefficient of thermal expansion of a glass obtained from the resulting product is $7.0 \times 10^{-6} K^{-1}$ or less (e.g., $2.0 \times 10^{-6} K^{-1}$ to $7.0 \times 10^{-6} K^{-1}$), and preferably $6.0 \times 10^{-6} K^{-1}$ or less, typically $3.0 \times^{-6} K^{-1}$ to $6.0 \times 10^{-6} K^{-1}$. For example, these powered raw materials may be mixed and stirred so as to provide a mixture that comprises 70 to 95% of a powdered glass flux comprising a high expansion lead-free glass composition and a low expansion lead-free glass composition, each having a coefficient of thermal expansion and a softening point in the above-mentioned preferable numerical range, and 5 to 30% of one or more decorating inorganic pigments.

Alternatively, the decorating material can be made by mixing separately prepared low expansion lead-free glass composition and high expansion lead-free glass composition with a pigment, a low expansion ceramic raw material (e.g. β-eucryptite) and the like, without previously mixing these two kinds of lead-free glass compositions (i.e., without preparing a glass flux of the present invention beforehand). For example, a low expansion lead-free glass composition having a thermal expansion coefficient in the range of $5.0 \times 10^{-6} K^{-1}$ to $6.5 \times 10^{-6} K^{-1}$ (preferably $5.5 \times 10^{-6} K^{-1}$ or more or less than $6.0 \times 10^{-6} K^{-1}$) may be mixed and stirred with a high expansion lead-free glass composition having a thermal expansion coefficient in the range of $7.0 \times 10^{-6} K^{-1}$ to $9.0 \times 10^{-6} K^{-1}$ (more preferably $7.5 \times 10^{-6} K^{-1}$ or more to less than $9.0 \times 10^{-6} K^{-1}$), together with a decorating pigment (typically, an inorganic pigment as described above) and, as necessary, various additives (a low expansion ceramic raw material, etc). In this case, a preferable mixing ratio by mass, taking the whole mixture as 100 parts, is 70 to 95 parts (e.g., 70 to 90 parts) of the total amount of the high expansion lead-free glass composition and the low expansion lead-free glass composition and 5 to 30 parts (e.g., 10 to 30 parts) of the inorganic decorating pigment. Here, the mixing ratio is determined such that the coefficient of thermal expansion of the mixture (i.e., the decorating material) is $7.0 \times 10^{-6} K^{-1}$ or less (e.g., $2.0 \times 10^{-6} K^{-1}$ to $7.0 \times 10^{-6} K^{-1}$), and preferably $6.0 \times 10^{-6} K^{-1}$ or less (e.g., $3.0 \times 10^{-6} K^{-1}$ to $6.0 \times 10^{-6} K^{-1}$). A preferable mixing ratio of the low expansion lead-free glass composition and high expansion lead-free glass composition that are added at this time is 5 to 25 parts of the high expansion lead-free glass composition to 75 to 95 parts of the low expansion lead-free glass composition on a mass basis (provided that the total of these compositions is 100 parts). Such a mixing ratio provides a decorating material for which a low coefficient of thermal expansion is achieved, which is suitable for applying an on-glaze (overglaze) decoration or the like on a glazed surface of a ceramic material (e.g., a hard glazed surface of a porcelain).

The present invention provides ceramic articles such as chinas and porcelains that are decorated with a decorating material taught herein. A decorating material taught herein can be used in the same manner as conventional decorating materials (paints). For example, it can be used for directly decorating a ceramic material by a paintbrush or the like. Alternatively, a decorating material taught herein can be used for a screen printing method. Ceramic materials suitable for decoration include various chinas (typically bone china), porcelains and earthenwares. The decorating material taught herein can be suitably used, particularly for applying a decoration on glazed surfaces of ceramic materials such as chinas and porcelains. Alternatively, in the case of using a transfer paper (decalcomania paper) for applying a decoration, the decorating material can also be used for forming a decorating layer of the transfer paper. Such a screen printing method and a method for using a transfer paper (decalcomania paper) can be performed according to conventional methods and are not the features that particularly characterize the present invention, so that detailed descriptions thereof are omitted.

Since a decorating material containing a glass flux of the present teaching has a low softening point, it can be suitably used in on-glaze (overglaze) decoration applications, in which the firing temperature is about 750 to 900° C. Therefore, the present invention can provide a decorating material with high chemical resistance comprising a glass flux and at least one pigment, such as zircon, as main components, which has a low melting point and a low coefficient of thermal expansion, that are suitable for forming an opaque white painting or the like on a hard glazed layer of porcelain.

EXAMPLES

The present invention will be described more specifically by way of examples below, but the present invention is not limited thereto.

A decoration material (paint) for applying an on-glaze decoration on a hard glazed surface of a porcelain was prepared, using as raw materials, glass compositions suitably selected from a total of three kinds of lead-free glass compositions (Product Examples 1 to 3) shown in Table 1 and a cobalt pigment (cobalt silicate). Product Example 1 is a glass composition that corresponds to the above-described low expansion lead-free glass composition; Product Example 2 is a glass composition that corresponds to the above-described high expansion lead-free glass composition; and Product Example 3 is a lead-free glass composition that does not correspond to the above-described high expansion lead-free glass composition in terms of the constitution, although having a high thermal expansion coefficient.

As shown in the columns of Examples 1 to 2 and Comparative Examples 1 to 2 in Table 2, glass compositions were selected for use. The glass compositions and the cobalt pigment were charged in a ball mill such that each of the mixing ratios shown in the table was obtained, followed by mixing and stirring for 8 to 10 hours. Thus, several powdered decorating materials (a total of 4 kinds) of Examples 1 to 2 and Comparative Examples 1 to 2 were made.

TABLE 1

| | Lead-free glass composition | | |
|---|---|---|---|
| | Product Ex. 1 | Product Ex. 2 | Product Ex. 3 |
| Thermal expansion coefficient ($K^{-1}$) | $5.8 \times 10^{-6}$ | $8.6 \times 10^{-6}$ | $7.8 \times 10^{-6}$ |
| Softening point (° C.) | 550 | 545 | 565 |
| Component (mass %) | | | |
| $SiO_2$ | 55 | 55 | 58 |
| $Al_2O_3$ | 8 | 7 | 7 |
| $B_2O_3$ | 24 | 9 | 18 |
| $Li_2O$ | 5 | 6 | 2 |
| $Na_2O$ | 2 | 4 | 8 |
| $K_2O$ | 2 | 3 | 2 |
| MgO | — | 2 | 1 |
| CaO | — | 3 | 1 |
| ZnO | — | 4 | — |
| $ZrO_2$ | 4 | 7 | 3 |

TABLE 2

| | Mixing ratio (mass %) | | | |
|---|---|---|---|---|
| | Ex. 1 | Ex. 2 | Com. Ex. 1 | Com. Ex. 2 |
| Low expansion lead-free glass composition (Product Ex. 1) | 72 | 64 | — | 80 |
| High expansion lead-free glass composition (Product Ex. 2) | 8 | 16 | 16 | — |
| Lead-free glass composition (Product Ex. 3) | — | — | 64 | — |
| Cobalt pigment | 20 | 20 | 20 | 20 |

The coefficient of thermal expansion of each of the decorating materials of the examples and Comparative Example 2 was less than $7.0 \times 10^{-6} K^{-1}$. Therefore, these decorating materials are suitable for applying an on-glaze decoration on a glaze of a ceramic material (typically, a hard glaze of a porcelain) that generally has a coefficient of thermal expansion rate of about $4 \times 10^{-6} K^{-1}$ to $6 \times 10^{-6} K^{-1}$. On the other hand, the decorating material of Comparative Example 1 had a thermal expansion coefficient as high as $8.0 \times 10^{-6} K^{-1}$ regardless of having the same composition as that of each of the examples, indicating that it was not suitable for applying an overglaze decoration on a glaze of a ceramic material (typically, a hard glaze of a porcelain).

Next, a glass layer (painting) was formed on a glazed surface of a porcelain by using each of the decorating materials of the examples and comparative examples. Then, it was evaluated for the characteristics. More specifically, a glaze listed in Table 3 was applied on the surface of the body of a porcelain to form a glaze layer. A decoration (on-glaze decoration) was applied on the glazed surface by using each of the decorating materials of Examples 1 to 2 and Comparative Examples 1 to 2. Then, the porcelain applied with the decoration was fired at 880°C to form a painting (glass layer) formed from each of the decorating materials.

TABLE 3

| | Glaze |
|---|---|
| Component (mass %) | |
| $SiO_2$ | 75.7 |
| $Al_2O_3$ | 12.5 |
| $Na_2O$ | 1.3 |
| $K_2O$ | 5.7 |
| MgO | 1.1 |
| CaO | 3.8 |
| Softening point (° C.) | 1250 |
| Thermal expansion coefficient ($\times 10^{-6} K^{-1}$) | 4.3 |

Luster

Visual inspection showed that each of the obtained paintings (glass layers) exhibited good luster.

Peeling Test

Each of the paintings was tested for the presence or absence of peeling due to crazing in the following manner. A commercially available adhesive cellophane tape was placed over the painting and the tape was rubbed with an eraser so as to be closely attached to the painting. Thereafter, the presence or absence of peeling of the painting was observed when the cellophane tape was removed from the painting. The results of the peeling test were shown in the corresponding fields of Table 4. As is clear from Table 4, each of the paintings formed from the decorating materials of Examples 1 and 2 and Comparative Example 2 showed no peeling in the test. From these results, it was proved that these decorating materials were suitable for applying an overglaze decoration on a glaze of a ceramic material. On the other hand, the painting formed from the decorating material of Comparative Example 1 exhibited peeling in the test. From this result, it was determined that the decorating material of Comparative Example 1, which had a high thermal expansion coefficient ($8.0 \times 10^{-6} K^{-1}$), was not suitable for applying a decoration on a glaze of a ceramic material.

Alkali Resistance

Each of the paintings was evaluated for the alkali resistance as the index of chemical resistance. More specifically, each of the paintings was immersed in a 0.5 M sodium carbonate solution (pH 11.0) at 100° C. for 2 hours. After the immersion, the surface of the painting was wiped with fabric, and the presence or absence of color and luster was evaluated by visual inspection. As a result, as indicated by "A" in the column "Chemical resistance" in Table 4, the color and luster were highly maintained after the alkali treatment in the case of the paintings formed from the decorating materials of the examples, as compared with the painting formed from the decorating material of Comparative Example 2.

Acid Resistance

Each of the paintings was immersed in a 4 M acetic acid solution (pH 2.5) at room temperature for 24 hours. After the immersion, the surface of the painting was wiped with fabric, and the change in color and luster before and after the immersion was evaluated by visual inspection. As a result, each of the paintings formed from the decorating materials of the examples showed no change in color and luster, exhibiting good acid resistance.

Other Chemical Resistances

A cleaning solution having a concentration of 0.15% was prepared using a commercially available detergent (product name: "Deter SHELL LK" (registered trademark of Shell International Petroleum Co. Ltd.)). Each of the painting was immersed in the cleaning solution at 70° C. for 16 hours. Further, each of the paintings was immersed in boiling water at 80° C. for 48 hours. After the immersion, the surface of the painting was wiped with fabric, and the change in color and luster before and after the immersion was evaluated by visual inspection in each of the detergent resistance test and the boiling water resistance test. As a result, each of the paintings formed from the decorating materials of the examples showed no change in color and luster, exhibiting good detergent resistance and boiling water resistance.

TABLE 4

|  | Peeling due to crazing | Alkali resistance |
| --- | --- | --- |
| Ex. 1 | No peeling | A |
| Ex. 2 | No peeling | A |
| Com. Ex. 1 | Peeling | A |
| Com. Ex. 2 | No peeling | B |

Specific examples of the present invention have been described above, but they are only illustrative and not limiting the scope of the claims. All changes and modifications from the specific examples illustrated above are intended to be embraced in the techniques disclosed in the appended claims. For example, in the formation of a glass flux of the present invention, two or more high expansion lead-free glass compositions having different compositions from each other may be mixed with two or more low expansion lead-free glass compositions having different composition from each other. The technical elements described in the specification can exhibit technical usefulness, either alone or in combination, and combinations are not limited to those described in the claims as filed. The techniques illustrated in the specification can achieve a plurality of purposes at the same time, and achieving only one of them has technical usefulness.

What is claimed is:

1. A lead-free glass flux suitable for coating onto a glazed surface, comprising the following two glass compositions:
    (a) a glass composition which is essentially free from lead and which comprises, in mass percent, $SiO_2$: 45 to 60%, $Al_2O_3$: 5 to 20%, $B_2O_3$: 15 to 35%, and one or more alkali metal oxides: 5 to 10%, provided that $Li_2O$ is contained in an amount of 2% or more, with the proviso that the total amount of said oxides is 90% or more of the total mass of the composition; and
    (b) a glass composition which is essentially free from lead and which comprises, in mass percent, $SiO_2$: 45 to 60%, $Al_2O_3$: 5 to 20%, $B_2O_3$: 5 to 20%, at least one of MgO, CaO, ZnO: 5 to 20% in total, and one or more alkali metal oxides: 10 to 15%, provided that $Li_2O$ is contained in an amount of 2% or more, with the proviso that the total amount of said oxides is 90% or more of the total mass of the composition,
    wherein the glass compositions (a) and (b) are mixed such that the coefficient of thermal expansion of a glass molded product formed from the flux is $6.5 \times 10^{-6} K^{-1}$ or less.

2. The glass flux according to claim 1, wherein the coefficient of thermal expansion of the glass composition (a) is in the range of $5.0 \times 10^{-6} K^{-1}$ to $6.5 \times 10^{-6} K^{-1}$ and the coefficient of thermal expansion of the glass composition (b) is in the range of $7.0 \times 10^{-6} K^{-1}$ to $9.0 \times 10^{-6} K^{-1}$.

3. The glass flux according to claim 1, wherein the softening point of each of the glass composition (a) and the glass composition (b) is in the range of 500 to 600° C.

4. The glass flux according to claim 1, wherein the mixing ratio of the glass composition (a) and the glass composition (b) in a mass ratio is 5 to 25 parts of the glass composition (b) to 75 to 95 parts of the glass composition (a), provided that the total of (a) and (b) is 100 parts.

5. The glass flux according to claim 1, wherein the glass composition (a) and the glass composition (b) that are mixed are each prepared in powdered form.

6. A composition suitable for the decoration of ceramic materials, comprising:
    a lead-free glass flux as claimed in claim 1 and at least one pigment.

7. The composition according to claim 6, further comprising at least one low expansion ceramic raw material in a content of 10% or less of the total mass of the composition.

8. The composition according to claim 6, wherein the composition is substantially composed of, in mass percent, 70 to 95% of said lead-free glass flux and 5 to 30% of at least one pigment.

9. A method for making a composition suitable for the decoration of ceramic materials, comprising the steps of:
    separately preparing:
    (a) a glass composition which is essentially free from lead, is composed mainly of $SiO_2$ and comprises $Al_2O_3$, $B_2O_3$ and $Li_2O$ as essential ingredients, whose coefficient of thermal expansion is in the range of $5.0 \times 10^{-6} K^{-1}$ to $6.5 \times 10^{-6} K^{-1}$;
    (b) a glass composition which is essentially free from lead, is composed mainly of $SiO_2$ and comprises $Al_2O_3$, $B_2O_3$, $Li_2O$ and at least one of MgO, CaO and ZnO, as essential ingredients, whose coefficient of thermal expansion is in the range of $7.0 \times 10^{-6} K^{-1}$ to $9.0 \times 10^{-6} K^{-1}$;
    (c) at least one pigment; and
    mixing the prepared glass composition (a), glass composition (b) and pigment (c) such that a decorating material having a coefficient of thermal expansion of $7.0 \times 10^{-6} K^{-1}$ or less is obtained as a final product.

10. The method according to claim 9, wherein the softening point of each of the glass composition (a) and the glass composition (b) is in the range of 500 to 600° C.

11. The method according to claim 9, wherein
    the glass composition (a) comprises, in mass percent, $SiO_2$: 45 to 60%, $Al_2O_3$: 5 to 20%, $B_2O_3$: 15 to 35%, and one or more alkali metal oxides: 5 to 10%, provided that $Li_2O$ is contained in an amount of 2% or more, with the proviso that the total amount of said oxides is 90% or more of the total mass of the composition, and wherein
    the glass composition (b) comprises, in mass percent, $SiO_2$: 45 to 60%, $Al_2O_3$: 5 to 20%, $B_2O_3$: 5 to 20%, at least one of MgO, CaO, ZnO: 5 to 20% in total, and one or more alkali metal oxides: 10 to 15%, provided that $Li_2O$ is contained in an amount of 2% or more, with the proviso that the total amount of said oxides is 90% or more of the total mass of the composition.

12. The method according to claim 9, wherein at least one low expansion ceramic raw material is further mixed in an amount of 10% or less of the total mass of the composition in the mixing step.

13. The method according to claim 9, wherein the glass composition (a) and the glass composition (b) are mixed in the ratio on a mass basis of 5 to 25 parts of the glass composition (b) to 75 to 95 parts of the glass composition (a), provided that the total of (a) and (b) is 100 parts, thereby obtaining a mixture which comprises, in mass percent, 70 to 95% of the total of the glass composition (a) and the glass composition (b) and 5 to 30% of the pigment (c), provided that the mixture obtained as a final product is substantially composed of the glass composition (a), the glass composition (b) and the pigment (c).

14. A ceramic article which has been decorated using a composition as claimed in claim 6.

* * * * *